United States Patent
Miles et al.

[11] Patent Number: 5,816,584
[45] Date of Patent: Oct. 6, 1998

[54] CHUCK WITH IMPROVED JAW BITE

[75] Inventors: Kevin C. Miles; Benjamin A. Gaddis, both of Clemson, S.C.

[73] Assignee: Power Tool Holders, Inc., Wilmington, Del.

[21] Appl. No.: 778,400

[22] Filed: Jan. 2, 1997

[51] Int. Cl.⁶ .................................................. B23B 31/12
[52] U.S. Cl. ............................ 279/62; 279/60; 279/123
[58] Field of Search ................... 279/43.6, 46.6, 279/60–65, 123, 902

[56] References Cited

U.S. PATENT DOCUMENTS

| | | |
|---|---|---|
| 247,035 | 9/1881 | Gage ............................................. 279/60 |
| 1,011,975 | 12/1911 | Lewis ........................................... 279/60 |
| 1,059,234 | 4/1913 | Taylor . |
| 1,894,515 | 8/1933 | Hubbell . |
| 1,898,264 | 2/1933 | Proefke ....................................... 279/123 |
| 1,924,301 | 8/1933 | Benford ....................................... 279/60 |
| 2,546,351 | 3/1951 | Stoner . |
| 3,795,406 | 3/1974 | Rohm . |
| 4,088,333 | 5/1978 | Nobile et al. . |
| 4,121,848 | 10/1978 | Morawski . |
| 4,239,246 | 12/1980 | Howlett . |
| 4,284,285 | 8/1981 | Futter . |
| 4,323,324 | 4/1982 | Eberhardt . |
| 4,386,879 | 6/1983 | Martinmaas . |
| 4,536,109 | 8/1985 | Hunger et al. . |
| 4,616,538 | 10/1986 | Hessbruggen . |
| 4,630,836 | 12/1986 | Hunger et al. ............................ 279/123 |
| 4,664,568 | 5/1987 | Rohm . |
| 4,726,719 | 2/1988 | Mack ........................................... 279/64 |
| 4,752,165 | 6/1988 | Wanner ....................................... 279/60 |
| 4,836,563 | 6/1989 | Rohm . |
| 4,840,387 | 6/1989 | McCarthy . |
| 4,840,519 | 6/1989 | Kleine . |
| 4,848,779 | 7/1989 | Wheeler et al. . |
| 4,856,797 | 8/1989 | Rall . |
| 4,913,449 | 4/1990 | Rohm . |
| 4,951,955 | 8/1990 | Sakamaki . |
| 4,991,860 | 2/1991 | Rohm . |
| 5,011,167 | 4/1991 | Jordan . |
| 5,141,239 | 8/1992 | Clay . |
| 5,195,760 | 3/1993 | Wheeler et al. . |
| 5,286,041 | 2/1994 | Rohm ......................................... 279/60 |
| 5,340,128 | 8/1994 | Weiss et al. . |
| 5,464,231 | 11/1995 | Clay . |
| 5,553,873 | 9/1996 | Salpaka et al. . |
| 5,580,197 | 12/1996 | Rohm . |

FOREIGN PATENT DOCUMENTS

| | | |
|---|---|---|
| 0059030A2 | 9/1982 | European Pat. Off. . |
| 3331866A1 | 3/1985 | Germany . |
| 3344552A1 | 6/1985 | Germany . |
| 3438595A1 | 4/1986 | Germany . |
| 63-207504 | 8/1988 | Japan . |
| 1227360A1 | 4/1986 | U.S.S.R. . |
| 2214455 | 9/1989 | United Kingdom . |

OTHER PUBLICATIONS

Measurement data and section sketch regarding drill chucks believed to be on sale before Jan. 2, 1996.
Photographs of drill chuck believed to be on sale before Jan. 2, 1996.

*Primary Examiner*—Steven C. Bishop
*Attorney, Agent, or Firm*—Dority & Manning, P.A.

[57] ABSTRACT

A chuck for use with a manual or powered driver having a rotatable drive shaft is provided. A plurality of jaws are slidably positioned in a body member. Each jaw has a jaw face formed on one side and threads formed on the opposite side. Each jaw face includes a first ridge substantially parallel to the chuck axis. The first ridge is offset from, and substantially parallel to, a plane including the jaw axis and the chuck axis. A second ridge is substantially parallel to the first ridge but offset from the plane opposite the first ridge. A third ridge is disposed between the first and second ridges and has a peak on the opposite side from the chuck axis of a plane including the peaks of the first and second ridges.

14 Claims, 6 Drawing Sheets

CHUCK WITH IMPROVED JAW BITE

BACKGROUND OF THE INVENTION

The present invention relates generally to chucks for use with drills or with electric or pneumatic power drivers. More particularly, the present invention relates primarily to a chuck of the keyless type which may be tightened or loosened by hand or by actuation of the driver motor.

Both hand tool drivers and electric or pneumatic tool drivers are well known. Although twist drills are the most common tools used with such drivers, screw drivers, nut drivers, burrs, mounted grinding stones and other cutting or abrading tools may also be used. Since the tool may have shanks having various diameters or polygonal cross sections, the device is usually provided with a chuck that is adjustable over a relatively wide range. The chuck may be attached to the driver by a threaded or tapered bore.

A wide variety of chucks have been developed in the art. In one form, three jaws spaced circumferentially approximately 120° apart from each other are constrained in angularly disposed passageways in a body. The body is attached onto the drive shaft and is configured so that rotation of the body in one direction relative to a constrained nut engaging the jaws forces the jaws into gripping relationship with respect to the cylindrical tool shank, while rotation in the opposite direction releases the gripping relationship. Such a chuck may be keyless if it is rotated by hand. One example of such a chuck is disclosed in U.S. Pat. No. 5,125,673 entitled "Non-impact Keyless Chuck" which is commonly assigned to the present assignee and the entire disclosure of which is incorporated by reference herein.

When such a chuck is tightened, the jaws eventually stop in a gripping relationship with a tool shaft, causing the jaw threads to urge the nut rearward. Typically, the nut bears against the body, for example via a thrust ring or a bearing inserted between the nut and a thrust ring, when forced rearward.

Further rotation wedges the nut between the jaw threads and the body, resisting further tightening rotation and bringing the chuck into a tightened condition.

In one typical configuration of chuck jaws, the jaw faces are ground after the chuck is assembled so that each jaw face has a substantially flat surface parallel to the chuck axis. Thus, as the jaws are moved inward by rotation of the nut, the flat jaw face surfaces grip the tool shaft to hold the shaft substantially along the chuck axis. One difficulty with flat jaw faces is that the tool shaft may tend to slide on the jaw surfaces, permitting the tool shaft to undesirably rotate within the jaw grip during use. To remedy this problem, it is known to include a ridge on the jaw face running parallel to the chuck axis. The ridge may have various configurations, for example including serrations. These "sharp bite" jaws provide improved shaft hold.

Jaws may be provided having multiple parallel ridges. One example is illustrated in a chuck manufactured by Rohm GmbH, where jaws are provided each having three parallel ridges. The peak of the center ridge is lower than the peaks of the outer ridges so that, looking at a cross-section of a jaw, the ridge peaks define a concave arc with respect to the jaw center. The Rohm chuck is described in U.S. Pat. Nos. 4,913,449, 4,955,623, 5,054,796, 5,236,206 and 5,375,858.

In one such Rohm chuck, the three peaks on a jaw face define an arc having a radius of approximately 0.33 inches. The measurement is approximate, given that the peaks have some degree of rounding. Additionally, the flanks of the ridges extend at a slope from either side of each peak. Thus, the jaw is believed to contact a bit shank of approximately 0.65 inches in diameter simultaneously at all three peaks. Larger bit shanks would be contacted by the two outer peaks while smaller bit shanks would be contacted by the center peak, assuming the jaw is aligned and that the bit is held by the three jaws.

In another such Rohm chuck, the three peaks on a jaw face define an arc having a radius of approximately 0.19 inches. The jaw would contact, simultaneously at all three ridge peaks, a bit shank of approximately 0.37 inches in diameter. A two peak bite would be provided to larger shanks while a single bite would be provided to smaller shanks.

SUMMARY OF THE INVENTION

The present invention recognizes and addresses considerations and drawbacks of prior art constructions and methods.

Accordingly, it is an object of the present invention to provide an improved chuck.

It is another object of the present invention to provide a chuck having jaws with an improved jaw bite.

It is a still further object of the present invention to provide a chuck having improved runout characteristics.

These and other objects are achieved by providing a chuck for use with a manual or powered driver having a rotatable drive shaft. The chuck comprises a generally cylindrical body member having a nose section and a tail section. The tail section has an axial bore formed therein to mate with the drive shaft of the driver. The nose section has an axial bore formed therein and a plurality of angularly disposed passageways formed therethrough and intersecting the axial bore.

A plurality of jaws are slidably positioned in each of the angularly disposed passageways. Each of the jaws has a jaw face formed on one side thereof and threads formed on the opposite side thereof. Each jaw face includes a first ridge substantially parallel to an axis of the axial bore of the nose section. The first ridge is offset from, and substantially parallel to, a plane including an axis of the jaw and the bore axis. The jaw face includes a second ridge substantially parallel to the first ridge and offset from the plane opposite the first ridge. The jaw face also includes a third ridge substantially parallel to the bore axis. The third ridge is disposed between the first and second ridges and has a peak on the opposite side from the bore axis of a plane including the peaks of the first ridge and the second ridge. The first, second and third ridges are configured so that the peaks of the three ridges define an arc having a radius not greater than approximately 5/32 inches.

A nut is rotatably mounted on the body in engagement with the threads on the jaws. A generally cylindrical sleeve member is in driving association with the nut whereby the jaws will be moved by the nut when the front sleeve member is rotated with respect to the body member.

Runout is a chuck accuracy problem. Using a drill bit as an exemplary tool shaft, runout is the offset between the point where a hole is actually drilled and the point where the hole would be drilled if the drill bit were perfectly aligned with the chuck axis. That is, runout is the effect of misalignment of the tool shaft, with respect to the chuck axis, when gripped by the jaws.

Runout magnitude is a measure of chuck accuracy. Various means of improving chuck accuracy are known, for example backfacing, where the rear face of the chuck is made true so that it fits flush against the face of the tool driver, and reducing jaw/jawhole clearance. Applicants continue to endeavor to minimize runout problems. The jaw bite of the present invention provides a pair of ridges on either side of a plane including the jaw center line and the chuck center line. The improved jaw bite improves the chuck's runout characteristics while maintaining the advantages of a sharp bite.

If the tool shaft diameter is relatively small, however, the shaft may fall between the ridge peaks so that it is held by the interior side surfaces, or flanks, of the ridges. In this situation, the jaws no longer provide a sharp bite. Accordingly, a third ridge is provided between the two outer ridges at a more shallow depth to provide a sharp bite to small tool shafts that fall between the two outer ridges. Although in this condition only a single sharp bite is provided per jaw, applicants have determined that smaller tool shafts have fewer runout concerns, as explained below.

The accompanying drawings, which are incorporated in and constitute a part of this specification, illustrate various embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
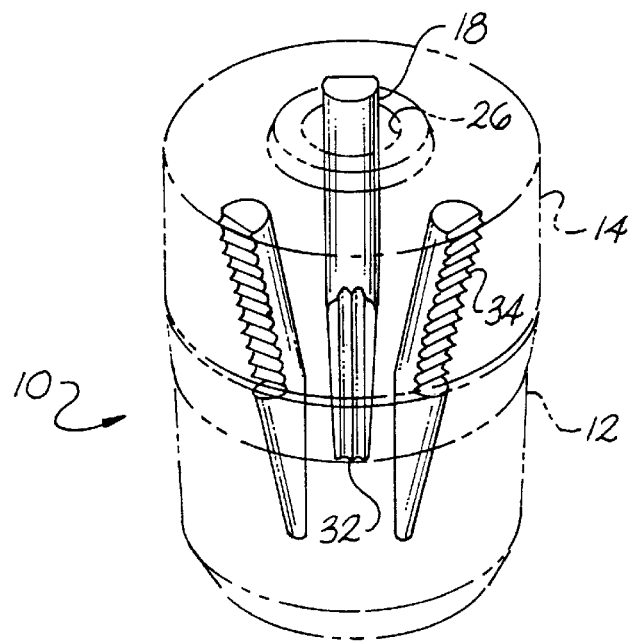
FIG. 1 is a perspective view of chuck jaws constructed in accordance with an embodiment of the present invention as disposed in a chuck.

Repeat use of reference characters in the present specification and drawings is intended to represent same or analogous features or elements of the invention.

DETAILED DESCRIPTION OF PREFERRED EMBODIMENTS

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof For instance, features illustrated or described as part of one embodiment may be used on another embodiment to yield a still further embodiment. Thus, it is intended that the present invention covers such modifications and variations as come within the scope of the appended claims and their equivalents.

Figure 5:
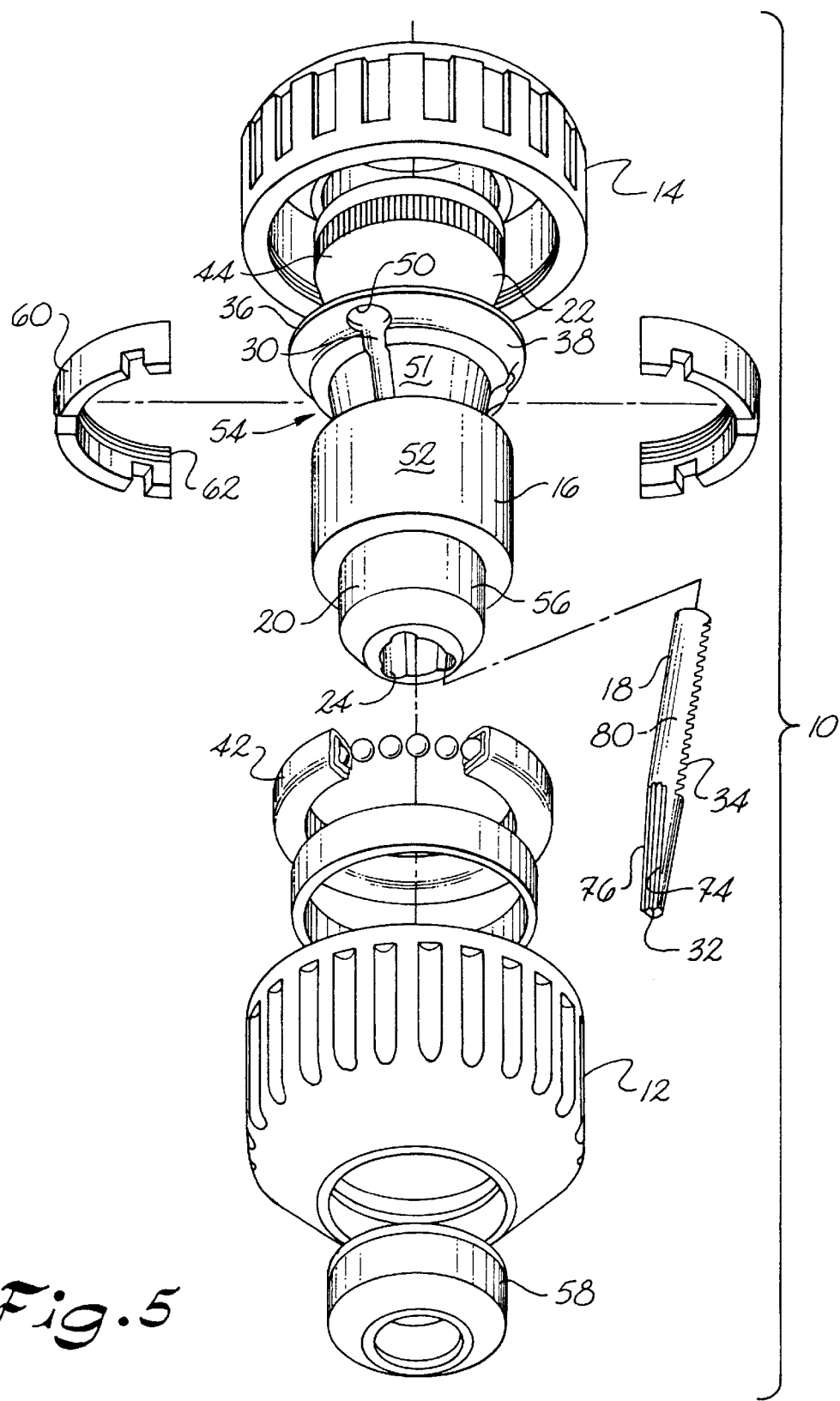
FIG. 5 is an exploded view of a chuck constructed in accordance with an embodiment of the present invention.

Referring to FIGS. 1 and 5, a chuck 10 is illustrated. Chuck 10 includes front sleeve member 12, an optional rear sleeve member 14, a body member 16 and jaws 18. Body member 16 is generally cylindrical in shape and comprises a nose or forward section 20 and a tail or rearward section 22. An axial bore 24 is formed in the nose section 20 and is somewhat larger than the largest tool shank that the chuck is designed to accommodate. A threaded bore 26 is formed in tail section 22 and is of a standard size to mate with the drive shaft of a powered or hand driver (not shown). The bores 24 and 26 may communicate at the central region of body member 16. While a threaded bore 26 is illustrated, such bore can be replaced with a tapered bore of a standard size to mate with a tapered drive shaft.

Passageways 30 are formed in body member 16 to accommodate each jaw 18. Preferably, three jaws 18 are employed, and each jaw 18 is separated from the adjacent jaw by an arc of approximately 120°. The axes of the passageways 30 and the jaws 18 are angled with respect to the chuck axis but intersect the chuck axis at a common point ahead of the chuck body 16. Each jaw 18 has a tool engaging face 32 which is generally parallel to the axis of axial bore 24, which is the axis of chuck body 16. Each jaw 18 also defines threads 34 on its opposite or outer surface.

Body member 16 includes a thrust ring 36 which may be integral with the body. Thrust ring 36 includes a thrust face 38 which may include an arcuate seating surface for engagement with the inner race of a self-contained antifriction bearing assembly 42. Thrust ring 36 includes a plurality of jaw guideways 50 formed around its circumference to permit retraction of the jaws 18.

Body member 16 includes a rear cylindrical portion 44 rearward of thrust ring 36. A second tapered portion 51 extends from the area of the thrust face 38 to a front cylindrical portion 52. Front cylindrical portion 52 is of greater diameter than the smaller end of second tapered portion 51 and forms a first circumferential groove 54 intermediate the nose and tail sections 20 and 22 of body 16. Body 16 further includes a reduced diameter nose portion 56 that is adapted to receive a nosepiece 58.

A nut 60 includes threads 62 for mating with threads 34 on jaws 18 whereby when the nut is rotated with respect to the body, the jaws will be advance or retracted. Front sleeve 12 is adapted to be loosely fitted over nose section 20 of chuck 10. Drive ribs (not shown) of front sleeve 12 engage drive slots 70 of nut 60 so that front sleeve 12 and nut 60 will be operably connected. That is, when front sleeve 12 is rotated, nut 60 will rotate therewith. Nosepiece 58 is dimensioned and adapted to be pressed onto nose portion 56 to maintain front sleeve 12 on chuck 10. It should be appreciated that nosepiece 58 could also be secured by snap fit, threading or the like. Nosepiece 58 is exposed when the chuck is assembled and is preferably coated with a non-ferrous metallic coating to prevent rust and to enhance its appearance. The operation of a nosepiece such as nosepiece 58 is disclosed in U.S. Pat. No. 5,348,317, the disclosure of which is fully incorporated herein by reference.

Figure 6:
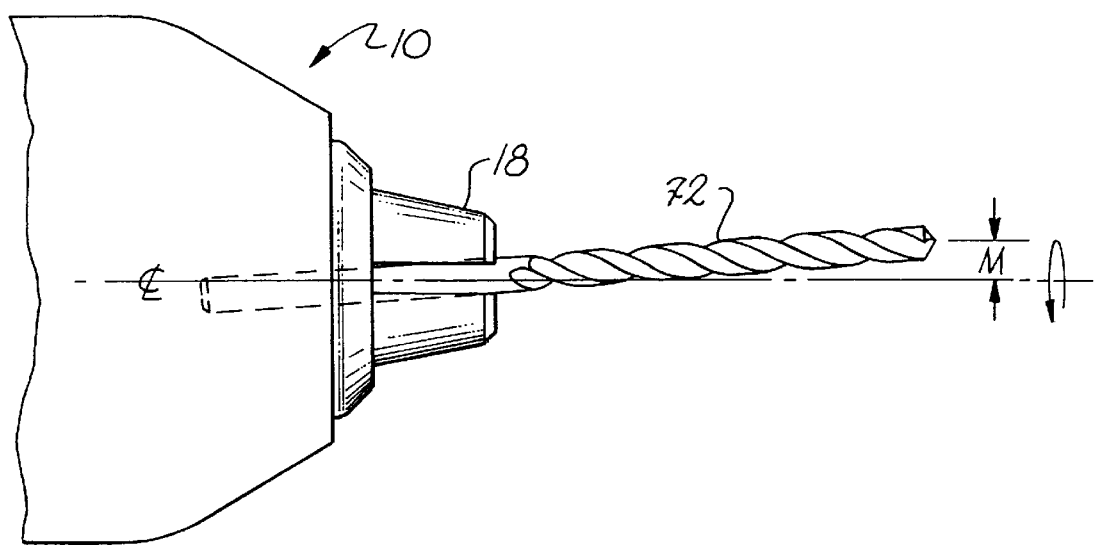
FIG. 6 is a side view of a chuck holding a bit shaft to illustrate runout.

As discussed above, runout is a chuck accuracy problem. If a tool shank, for example a drill bit, is not aligned with the chuck axis when the chuck is tightened, the drill bit deviates a distance M (FIG. 6) from the chuck axis. Distance M is runout magnitude. Magnitude M is exaggerated in FIG. 6 for ease of illustration.

Figure 2:
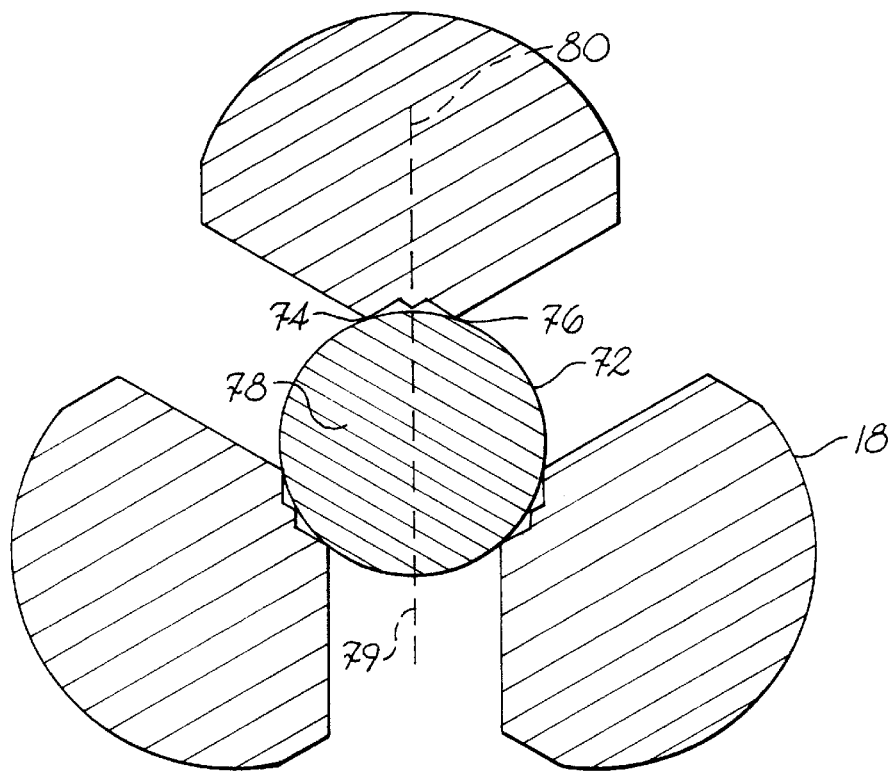
FIG. 2 is a cross sectional view of chuck jaws constructed in accordance with an embodiment of the present invention holding a tool shaft.
Figure 7:
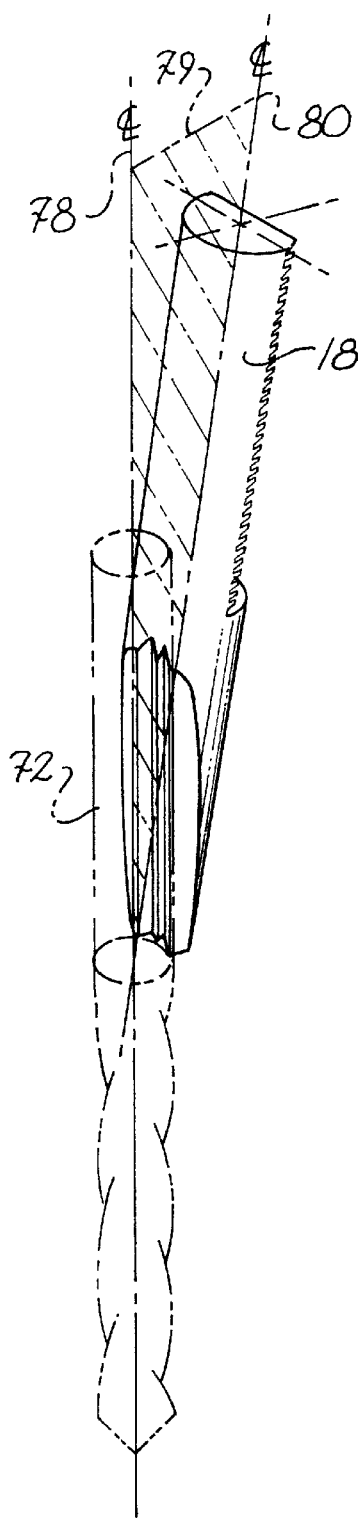
FIG. 7 is a perspective view of a chuck jaw in relation to a tool shaft aligned along the chuck axis, illustrating a plane including the chuck axis and the jaw axis.

To improve chuck runout characteristics while maintaining sharp bite contact with a drill bit, jaws 18, as illustrated in cross section in FIG. 2, include a pair of ridges 74 and 76 running substantially parallel to the nose section bore axis 78 on either side of a plane 79 (FIG. 7) including bore axis 78 and jaw axis 80. Jaw 18 provides a sharp bite at the peak of each ridge 74 and 76. Preferably, the peaks are sharp with little or no rounding. As those of ordinary skill in this art should understand, however, typical manufacturing processes and chuck use may round the peaks. Thus, in one preferred embodiment, the peaks are constructed so that they have a rounding of no more than approximately an arc of radius 0.008 inches. Although the present invention is not limited thereto, such rounding provides one exemplary "sharp bite" as that phrase is used herein.

Figure 3:
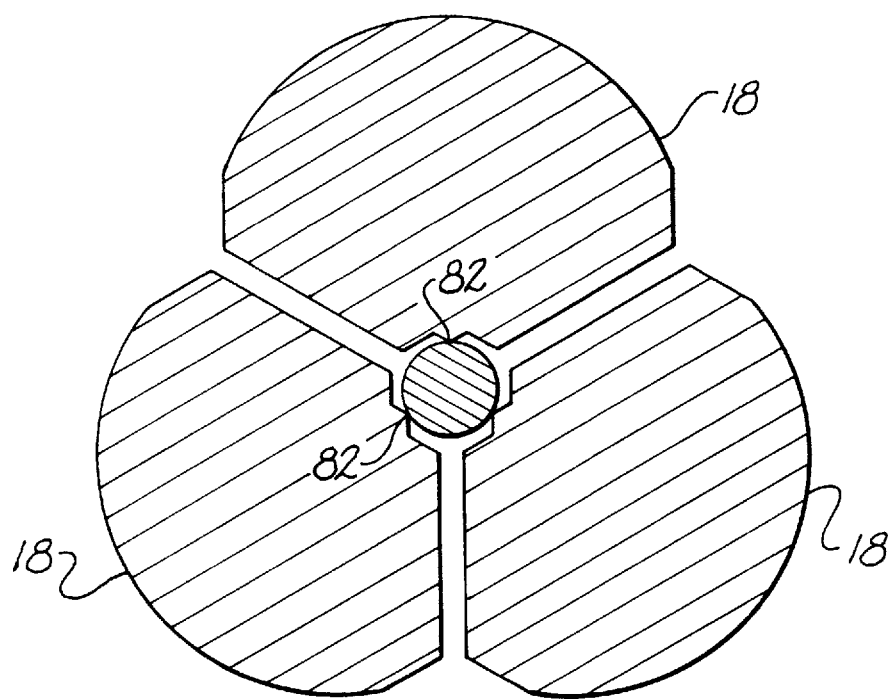
FIG. 3 is a cross sectional view of chuck jaws constructed in accordance with an embodiment of the present invention holding a tool shaft.
Figure 4:
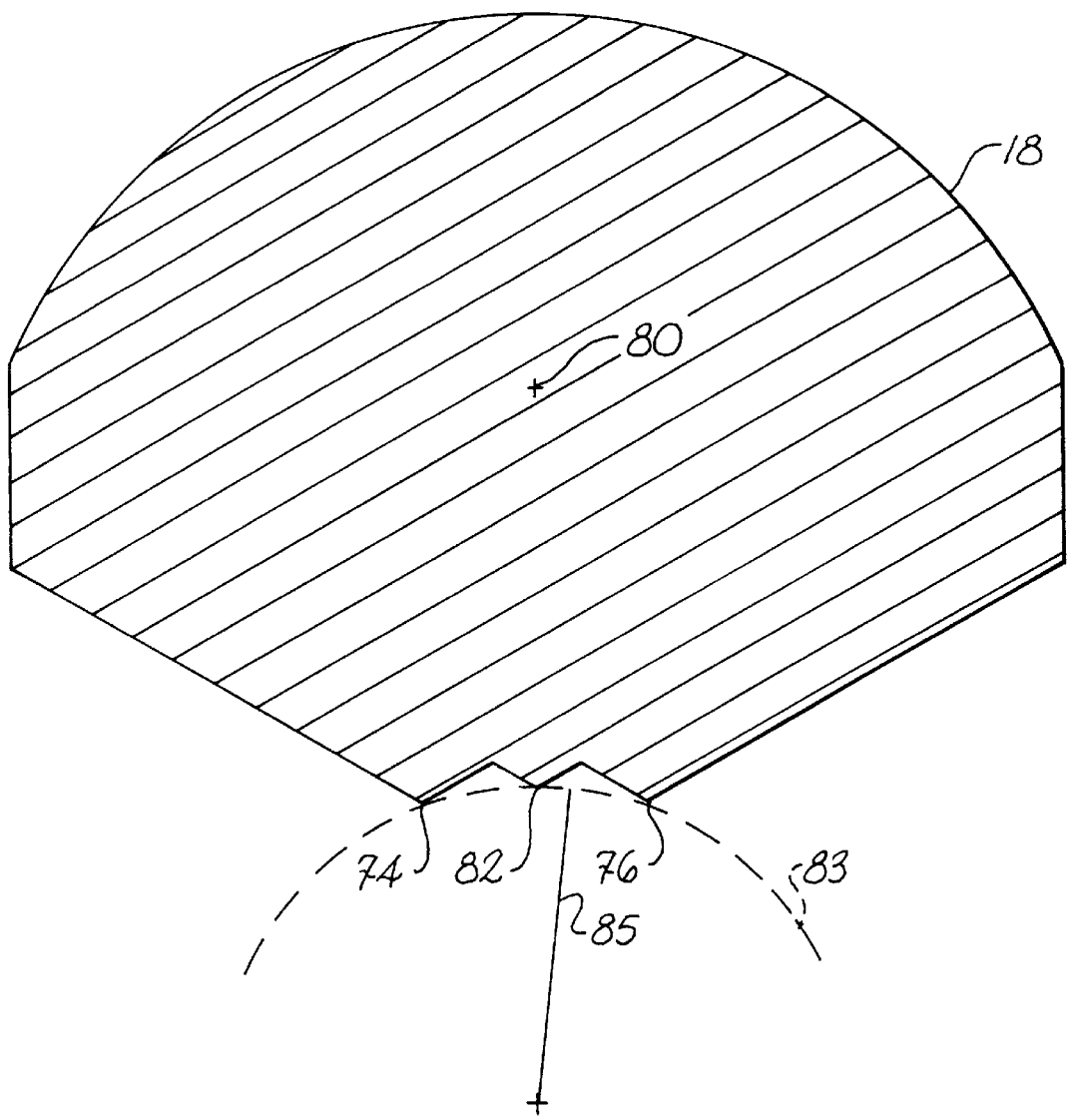
FIG. 4 is a cross sectional view of a chuck jaw constructed in accordance with an embodiment of the present invention.

If drill bit 72 is small enough, the peaks of ridges 74 and 76 do not grip the bit shank, and the shank falls between the peaks. To provide a sharp bite for such smaller bits, a center ridge 82 is disposed between the outer ridges, as shown in FIGS. 3 and 4. The transition between larger bits which are held by the two outer peaks and smaller bits held by the inner peak may not be instantaneous, however, depending on the geometry of the jaw. For example, rounding of the peaks and/or a relatively small slope of the ridge flanks may cause a small range of bits to be gripped at the inward flanks of the outer peaks. Because slipping may occur at the flat flank surfaces, it is preferred that the depth of the center peak with respect to the outer peaks be such that a bit shank will be held by the two outer peaks, the center peak, or all three peaks simultaneously, depending on the shank's diameter. For example, such a condition exists where the outer peaks are separated by approximately 0.07 inches, the center peak is at most approximately 0.009 inches below the outer peaks, the peak rounding is at a radius of approximately 0.008 inches and the ridge flanks are separated by an angle of approximately 120°.

Figure 8:
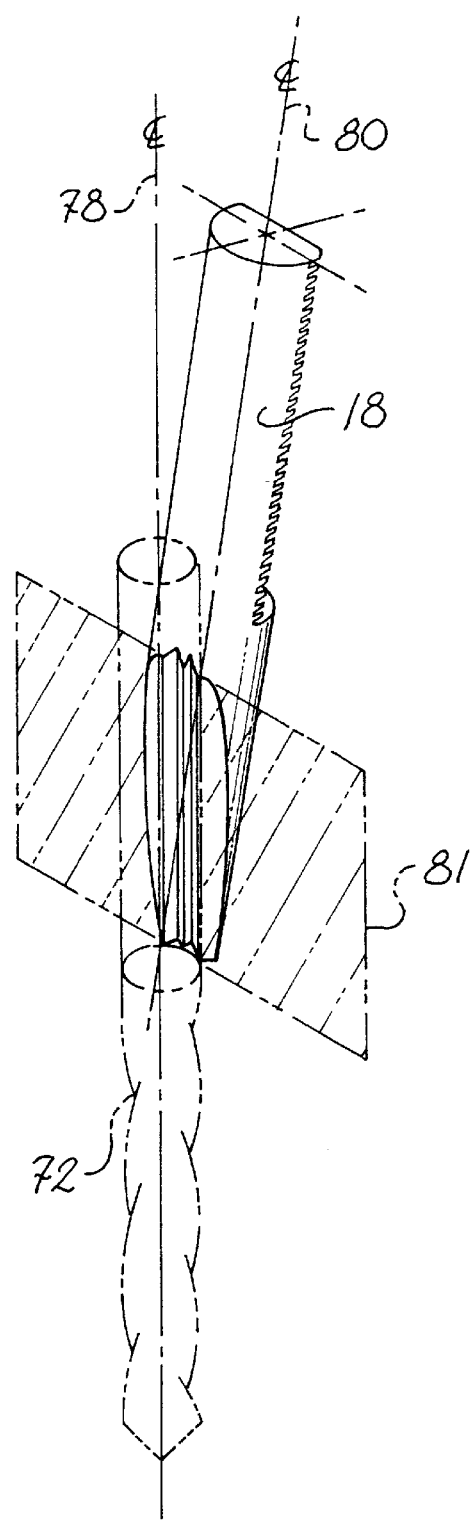
FIG. 8 is a perspective view of a chuck jaw in relation to a tool shaft aligned along the chuck axis, illustrating a plane including the peaks of two ridges on the jaw face.

The center ridge is disposed far enough below the plane 81 (FIG. 8) to permit a suitable range of bits to be gripped by the two outer ridges without interference from the center ridge. The jaw thus provides a two peak sharp bite to the shanks of those bits. Smaller bits are held by the center peak provided, as discussed above, that the center peak is high enough with respect to the outer peaks to prevent the shank from resting only against the ridge flanks. Thus, for example as shown in FIG. 4, the peaks of ridges 74, 76 and 82 may be configured so that they define an arc 83 having a radius 85 of approximately 5/32 inches. The peaks therefore approximately simultaneously contact a bit shank having a 5/16 inch diameter. The jaw provides at least a two peak sharp bite to shanks this size and larger and a single peak sharp bite to smaller shanks. The outer peaks of one exemplary such jaw are separated by approximately 0.07 inches while the center peak is approximately 0.0038 inches below a plane including the two outer peaks. It should be understood, however, that these dimensions may be affected by factors such as the ridge geometry, for example the peak rounding and the flank slopes. The above dimensions assume that the peaks are rounded to an approximately 0.008 inch radius and that the flanks are separated by approximately 120°.

The center peak may be lowered to provide a two peak sharp bite to a greater range of bit sizes. Thus, for example, the ridge peaks may be configured so that radius 85 is approximately 1/8 inches or 3/32 inches. However, the center peak depth also affects the ability of the jaws to effectively hold very small bits. If the center peak is deep enough with respect to the outer peaks, the jaws' outer peaks may interfere with each other before the three center peaks can securely hold a very small bit. Thus, in another preferred embodiment, the outer peaks are separated by approximately 0.07 inches, while the center peak is approximately 0.0047 inches below the plane including the outer peaks. This arrangement provides a two peak bite for shanks larger than approximately 1/4 inch in diameter and a single peak bite for shanks of smaller diameters, down to approximately 1/16 inches. Again, these dimensions may be affected by other factors. For example, if the peaks have no rounding, a slightly larger center peak depth would be expected for the three jaw peaks to simultaneously contact a 1/4 inch diameter shank. Assuming that the distance between the outer ridges is approximately 0.07 inches, that the peak rounding is approximately 0.008 inches and that the ridge flanks are separated by an angle of 120°, the following table describes bit shanks which would approximately simultaneously contact peaks of all three ridges of jaws having the stated dimensions. All dimensions are in inches.

| Approximate Distance Between Outer Peaks | Approximate Depth of Center Peak | Approximate Diameter of Bit Shank Contacting All Peaks |
|---|---|---|
| 0.070 | 0.0094 | 0.124 |
| 0.070 | 0.0088 | 0.132 |
| 0.070 | 0.0078 | 0.149 |
| 0.070 | 0.0070 | 0.166 |
| 0.070 | 0.0068 | 0.171 |
| 0.070 | 0.0064 | 0.182 |
| 0.070 | 0.0058 | 0.201 |
| 0.070 | 0.0054 | 0.216 |
| 0.070 | 0.0050 | 0.234 |
| 0.070 | 0.0048 | 0.244 |
| 0.070 | 0.0047 | 0.250 |
| 0.070 | 0.0044 | 0.267 |
| 0.070 | 0.0041 | 0.287 |
| 0.070 | 0.0039 | 0.303 |
| 0.070 | 0.0038 | 0.311 |

Of course, the distances between the ridges may vary somewhat from those given in the table above depending, for example, on machine tolerances. Additionally, as illustrated in the Figures, the peaks of ridges 74 and 76 are, preferably, equidistant from plane 79. The table assumes this configuration. Bit diameters were estimated from CAD drawings.

As shown in FIG. 3, smaller bits gripped only by center ridges 82 of jaws 18 are subject to a single sharp bite per jaw. The single bite is acceptable, however, for such small bits. For example, runout magnitude is measured between the chuck axis and the end of the bit. Since smaller bits tend to be shorter than larger bits, runout is less of a concern.

As noted above, jaw ridges may be serrated. The dimensions discussed herein are measured from the shank-contacting surfaces of such jaws.

Those of ordinary skill in this art should understand that a variety of chuck constructions might implement the improved jaw bit construction of the present invention. Thus, the chuck configuration illustrated in FIG. 5 is presented by way of example only and is not intended as a limitation on the present invention. For example, while the above description is set forth with respect to a keyless chuck, it should be appreciated that the principles of the present invention are equally applicable to a keyed chuck. Furthermore, for example, the bearing may be omitted so that the nut bears directly on the body in some fashion. In addition, a one piece nut configuration could be utilized instead of a broken nut.

Accordingly, while preferred embodiments of the invention have been described above, it is to be understood that any and all equivalent realizations of the present invention are included within the scope and spirit thereof Thus, the embodiments depicted are presented by way of example only and are not intended as limitations upon the present invention, and those of ordinary skill in this art should understand that many modifications may be made. Therefore, it is contemplated that any and all such embodiments are included in the present invention as may fall within the literal or equivalent scope of the appended claims.

What is claimed is:

1. A chuck for use with a manual or powered driver having a rotatable drive shaft, said chuck comprising:

a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore;

a plurality of jaws slidably positioned in each of said angularly disposed passageways, each of said jaws having a jaw face formed on one side thereof and threads formed on the opposite side thereof, each said jaw face including a first ridge substantially parallel to an axis of said axial bore of said nose section, said first ridge offset from, and substantially parallel to, a plane including an axis of said jaw and said bore axis, a second ridge substantially parallel to said first ridge and offset from said plane opposite said first ridge, and a third ridge substantially parallel to said bore axis, said third ridge disposed between said first ridge and said second ridge and having a peak on the opposite side from said bore axis of a plane including the peaks of said first ridge and said second ridge;

wherein said first ridge, said second ridge and said third ridge are configured so that said peaks of said first ridge, said second ridge and said third ridge define an arc having a radius not greater than approximately $5/32$ inches;

a nut rotatably mounted on said body in engagement with said threads on said jaws; and a generally cylindrical front sleeve member in driving association with said nut whereby said jaws will be moved by said nut when said front sleeve member is rotated with respect to said body member.

2. A chuck as in claim 1, wherein said radius of said arc is not greater than approximately $1/8$ inches.

3. A chuck as in claim 1, wherein said radius of said arc is not greater than approximately $3/32$ inches.

4. A chuck as in claim 1, wherein said radius of said arc is not greater than approximately $1/16$ inches.

5. A chuck as in claim 1, wherein said first ridge and said second ridge are equidistant from said plane including said jaw axis and said bore axis.

6. A chuck as in claim 1, wherein said plane including said jaw axis and said bore axis includes said peak of said third ridge.

7. A chuck as in claim 1, wherein said first distance is within a range of 0.065 inches to 0.075 inches.

8. A chuck as in claim 7, wherein said first distance is approximately 0.070 inches.

9. A chuck as in claim 1, wherein said second distance is within a range of 0.0027 inches to 0.0067 inches.

10. A chuck as in claim 9, wherein said second distance is approximately 0.0047 inches.

11. A chuck for use with a manual or powered driver having a rotatable drive shaft, said chuck comprising:

a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore;

a plurality of jaws slidably positioned in each of said angularly disposed passageways, each of said jaws having a jaw face formed on one side thereof and threads formed on the opposite side thereof, each said jaw face including a first ridge substantially parallel to an axis of said axial bore of said nose section, said first ridge offset from, and substantially parallel to, a plane including an axis of said jaw and said bore axis, a second ridge substantially parallel to said first ridge and offset from said plane opposite said first ridge, and a third ridge substantially parallel to said bore axis, said third ridge disposed between said first ridge and said second ridge and having a peak on the opposite side from said bore axis of a plane including the peaks of said first ridge and said second ridge;

wherein peaks of said first ridge and said second ridge are separated by approximately 0.07 inches and wherein the peak of said third ridge is at least approximately 0.004 inches beyond said plane including said peaks of said first and second ridges, opposite said bore axis;

a nut rotatably mounted on said body in engagement with said threads on said jaws; and a generally cylindrical front sleeve member in driving association with said nut whereby said jaws will be moved by said nut when said front sleeve member is rotated with respect to said body member.

12. A chuck as in claim 11, wherein said peak of said third ridge is at least approximately 0.005 inches beyond said plane including said peaks of said first and second ridges.

13. A chuck as in claim 11, wherein said peak of said third ridge is at least approximately 0.006 inches beyond said plane including said peaks of said first and second ridges.

14. A chuck as in claim 11, wherein said peak of said third ridge is at least approximately 0.009 inches beyond said plane including said peaks of said first and second ridges.

* * * * *